United States Patent [19]
Nashiki

[11] Patent Number: 5,469,215
[45] Date of Patent: Nov. 21, 1995

[54] METHOD AND APPARATUS FOR CONTROLLING AN ELECTRIC MOTOR WITH COMPENSATION OR TORQUE RIPPLE

[75] Inventor: Masayuki Nashiki, Niwa, Japan

[73] Assignee: Okuma Corporation, Aichi, Japan

[21] Appl. No.: 282,434

[22] Filed: Jul. 29, 1994

[30] Foreign Application Priority Data

Aug. 2, 1993 [JP] Japan ..................... 5-191020

[51] Int. Cl.⁶ ..................................................... H02P 7/00
[52] U.S. Cl. ................ 318/432; 318/632; 318/799; 318/610; 388/815; 388/902; 388/907.5; 388/930
[58] Field of Search ................... 318/432, 434, 318/632, 600–601, 609–610, 799–815; 388/809–815, 902, 906, 907.5, 930

[56] References Cited

U.S. PATENT DOCUMENTS 3,919,609  11/1975  Klautschek et al. .................. 318/803
4,415,844  11/1983  Mendenhall et al. ............... 388/801 X
4,959,797  8/1990  McIntosh ........................... 318/594 X
5,122,719  6/1992  Bessenyei et al. .................. 318/629
5,223,775  6/1993  Mongeau ............................. 318/432
5,229,677  7/1993  Dade et al. .......................... 318/538

Primary Examiner—David S. Martin
Attorney, Agent, or Firm—Rothwell, Figg, Ernst & Kurz

[57] ABSTRACT

An electric motor control system compensates torque ripples to control the rotation of an electric motor more accurately. Compensated current amplitudes corresponding to the torques, speeds and rotational positions in the electric motor are stored in a memory 61. Address setting unit 91 prepares a read address $AD_1$ in the memory 61 from the torque command T, speed information VL and rotational motor position P. The prepared read address $AD_1$ is then used to read a torque error compensation data $MD_1$ from the memory 61. An adder 12 adds the torque error compensation data $MD_1$ thus prepared to the torque command T to determine current amplitudes AM in the electric motor. Three-phase current setting unit 10 sets three-phase AC current commands CU, CV and CW based on the current amplitudes AM and rotational motor position P. Thus, the rotation of the electric motor can be accurately controlled.

8 Claims, 8 Drawing Sheets

| ROTATIONAL POSITION P | TORQUE ERROR |
|---|---|
| P1 | DT1 |
| P2 | DT2 |
| P3 | DT3 |
| P4 | DT4 |
| P5 | DT5 |

| ROTATIONAL SPEED VL / ROTATIONAL POSITION P | VL1 | VL2 | VL3 | -------- |
|---|---|---|---|---|
| P1 | DT11 | DT12 | DT13 | -------- |
| P2 | DT21 | DT22 | DT23 | -------- |
| P3 | DT31 | DT32 | DT33 | -------- |
| P4 | DT41 | DT42 | DT43 | -------- |

| TORQUE COMMAND T | SERIES INFORMATION |
|---|---|
| T0 | FT0 |
| T1 | FT1 |
| T2 | FT2 |
| T3 | FT3 |
| ⋮ | ⋮ |
| TX | FTX |
| ⋮ | ⋮ |

Fig. 9

| ORDER | AMPLITUDE | PHASE |
|---|---|---|
| 0 | FA0 | NONE |
| 1 | FA1 | FP1 |
| 2 | FA2 | FP2 |
| 3 | FA3 | FP3 |
| 4 | FA4 | FP4 |
| 5 | FA5 | FP5 |
| ⋮ | ⋮ | ⋮ |

Fig. 10

METHOD AND APPARATUS FOR CONTROLLING AN ELECTRIC MOTOR WITH COMPENSATION OR TORQUE RIPPLE

BACKGROUND OF THE INVENTION

1. Field of the Invention

The present invention relates to an apparatus for controlling electric commonly used motors, such as DC motors, synchronous motors, induction motors and other motors.

2. Description of the Prior Art

FIG. 1 is a block diagram of a control system used in a three-phase synchronous motor and constructed in accordance with the prior art.

The control system comprises a position sensor 8 for sensing the rotational position P of a three-phase synchronous motor 7. The position sensor 8 is connected to a speed sensor 5 for sensing a rotational speed VL based on the rotational position P. The speed sensor 5 is connected to a subtracter 1 for subtracting the rotational speed VL from a speed command VLC to determine a speed error DVL. The subtracter 1 is also connected to a PID compensator 2 for compensating the speed error DVL to output a torque command value T. The PID compensator 2 is connected to a current command value setting means 3 for setting motor current commands CU, CV and CW based on the rotational motor position P and torque command value T. The current command value setting means 3 is also connected to a memory 6 for storing torque ripple error information in the electric motor and a power amplifier 4 for supplying three-phase currents IU, IV and IW corresponding to the motor current commands CU, CV and CW to the electric motor 7.

As shown in FIG. 2, the current command value setting means 3 comprises an address setting means 9 for preparing a read address of AD in the memory 6 based on the rotational motor position P, an adder 12 for adding torque error information MD read out of the memory 6 to the torque command value T to determine a current amplitude AM in the electric motor and a three-phase current setting means 10 for setting motor current commands CU, CV and CW from the current amplitude AM and rotational motor position P.

On operation, the position sensor 8 senses the rotational position P of the three-phase synchronous motor 7 while the speed sensor 5 senses the rotational speed VL from the rotational position P. On the other hand, the subtracter 1 receives the speed command VLC and subtracts the rotational speed VL from the speed command VLC to determine the speed error DVL. The speed error DVL is compensated by the PID compensator 2 which in turn outputs the torque command value T toward the current command value setting means 3. The current command value setting means 3 then sets the motor current commands CU, CV and CW based on the rotational motor position P and torque command value T. The motor current commands thus set are provided to the power amplifier 4 which in turn supplies the three phase motor currents IU, IV, IW to the electric motor 7.

The operation of the current command value setting means 3, that is, a process of preparing three phase current command values with a technique of compensating the torque ripple in the electric motor will be described below.

The rotational motor position P is used to prepare the read address AD of the memory 6 at which the torque error information in the electric motor is stored. The read address AD is then used to read the torque error information MD corresponding to the rotational motor position P. The adder 12 adds the torque error information MD to the torque command value T to calculate the current amplitude AM in the electric motor. The three phase current setting means 10 sets the motor current commands CU, CV and CW from the current amplitude AM and rotational motor position P according to the following equations:

$$CU = AM \times \sin P \quad (1)$$

$$CV = AM \times \sin(P+120) \quad (2)$$

$$CW = AM \times \sin(P+240) \quad (3)$$

$$AM = T + MD \quad (4).$$

The torque error information MD has been stored in the memory 6 based on the relationship between the rotational positions P (P1, P2 ...) and the corresponding torque errors (DT1, DT2 ...), as shown in FIG. 3. As a result, the slot torque ripple and other factors at each of the rotational motor positions can be compensated to realize a control by which the torque ripple being an error component in the motor output torque is relieved.

In general, the stator and rotator of the electric motor produce an error torque known as torque ripple since the shapes of the winding slots, magnetic poles and others are discontinuous in the rotational direction. The magnitude of such an error torque can vary between about 0.5% of the rated torque and equal to or higher than 10% from case to cases, depending on the type of motor. Particularly, a reluctance motor tends to increase the torque ripple since the magnetic resistance in the rotator becomes larger depending on the rotational position. Where it is required to control the electric motor with an increased accuracy, the torque ripple raises an important problem if the vibrations and noises in the electric motor may adversely affect the circumferences.

The motor control system of the prior art had a problem in that the torque and speed could not be accurately controlled, resulting from the dependency of the motor torque ripple on the rotational position as well as the torque; the non-linear change of the torque ripple depending on the magnitude of the torque; and the relation of cause and effect with the rotational speed from the delay in the control of the entire system. Particularly, where an electric motor having an increased reaction on the armature is used, the torque ripple form may not be in proportion to the output torque of the electric motor. A synchronous motor using an electromagnet has an increased freedom of an electromagnet field. However, even when such a type of synchronous motor is driven with an unsaturated electromagnet field density, the torque ripple form may not be in proportion to the output of the electric motor.

The structure of the electric motor itself has been modified to relieve the torque ripple therein. For example, the gap between the stator and the rotator has been increased; the structure of the rotator has been uniquely modified; and the stator or rotator has been arranged to be skewed relative to the rotational axis. However, such devises will reduce the efficiency in the electric motor. Thus, the motor must correspondingly be increased in size and complicated in structure, leading to increase of the manufacturing cost. Furthermore, the torque error in the electric motor depends on various parameters. If all the parameters such as torque compensation data, motor current values and others are to be stored in the memory means, the memory capacity will be huge, also leading to increase of the memory cost.

SUMMARY OF THE INVENTION

In order to overcome the above problems, an object of the present invention is to provide a control system which can compensate the torque ripple in an electric motor to control the rotation thereof with an improved accuracy.

To this end, the present invention provides an electric motor control system for compensating the rotation error in an electric motor operated by a given torque command, the control system comprising control information storage means for storing control information corresponding to the torques, rotational speeds and rotational positions of the electric motor, a position sensor for sensing the rotational position of the electric motor, a speed sensor for sensing the rotational speed of the electric motor, control information reading means for reading the control information corresponding to the torque command, rotational speed and rotational position of the running motor, motor current setting means for preparing a motor current command based on the read control information, and a power amplifier for supplying current and voltage corresponding to the motor current command to the electric motor.

Preferably, the control information stored in the control information storage means includes data used to compensate the torque error corresponding to the torque, rotational speed and rotational position of the electric motor. The motor current setting means is adapted to prepare the motor current command by adding the torque error compensation data to the given torque command.

Preferably the control information stored in the control information storage means also includes motor current information corresponding to the torque, rotational speed and rotational position of the electric motor. The motor current setting means is adapted to prepare the motor current command from the read motor current information.

Preferably the control information stored in the control information storage means further includes information represented only by a term or terms of series developed current information in which the amplitude is equal to or larger than a predetermined level. The motor current setting means is adapted to determine a series from each term in the series developed current information read out to prepare a motor current command.

The present invention also provides a method of compensating the rotation error of an electric motor operated by a given torque command, comprising the steps of previously storing control information corresponding to the torques, rotational speeds and rotational positions of the electric motor, sensing the rotational position of the electric motor, sensing the rotational speed of the electric motor, reading the control information corresponding to the torque command, rotational speed and rotational position of the running motor, preparing a motor current command based on the read control information, and supplying current and voltage corresponding to the motor current command to the electric motor.

Preferably, the control information storing step includes a step of storing data used to compensate the torque error corresponding to the torque, rotational speed and rotational position of the electric motor. The motor current command preparing step includes a step of preparing the motor current command by adding the torque error compensation data to the given torque command.

Preferably, the control information storing step also includes a step of storing motor current information corresponding to the torque, rotational speed and rotational position of the electric motor. The motor current command preparing step includes a step of preparing the motor current command from the read motor current information.

Preferably, the control information storing step further includes a step of series developing the motor current information and storing information represented only by a term or terms of series developed current information in which the amplitude is equal to or larger than a predetermined level. The motor current command preparing step includes a step of determining a series from each term in the series developed current information read out to prepare a motor current command.

In such a manner, the current and voltage applied to the electric motor can be compensated depending on changes in the rotational speed, rotational position and torque of the electric motor which may cause changes in the torque error of the electric motor. Thus, the torque error in the electric motor can be reduced without increase of the size and manufacturing cost of the electric motor.

BRIEF DESCRIPTION OF THE ACCOMPANY DRAWINGS

FIG. 9 is a table of series information data relating to the present invention.

FIG. 10 is another table of series information data relating to the present invention.

DETAILED DESCRIPTION OF THE PREFERRED EMBODIMENTS

The preferred embodiments of the invention will now be described with reference to the drawings.

Embodiment 1

Figure 1:
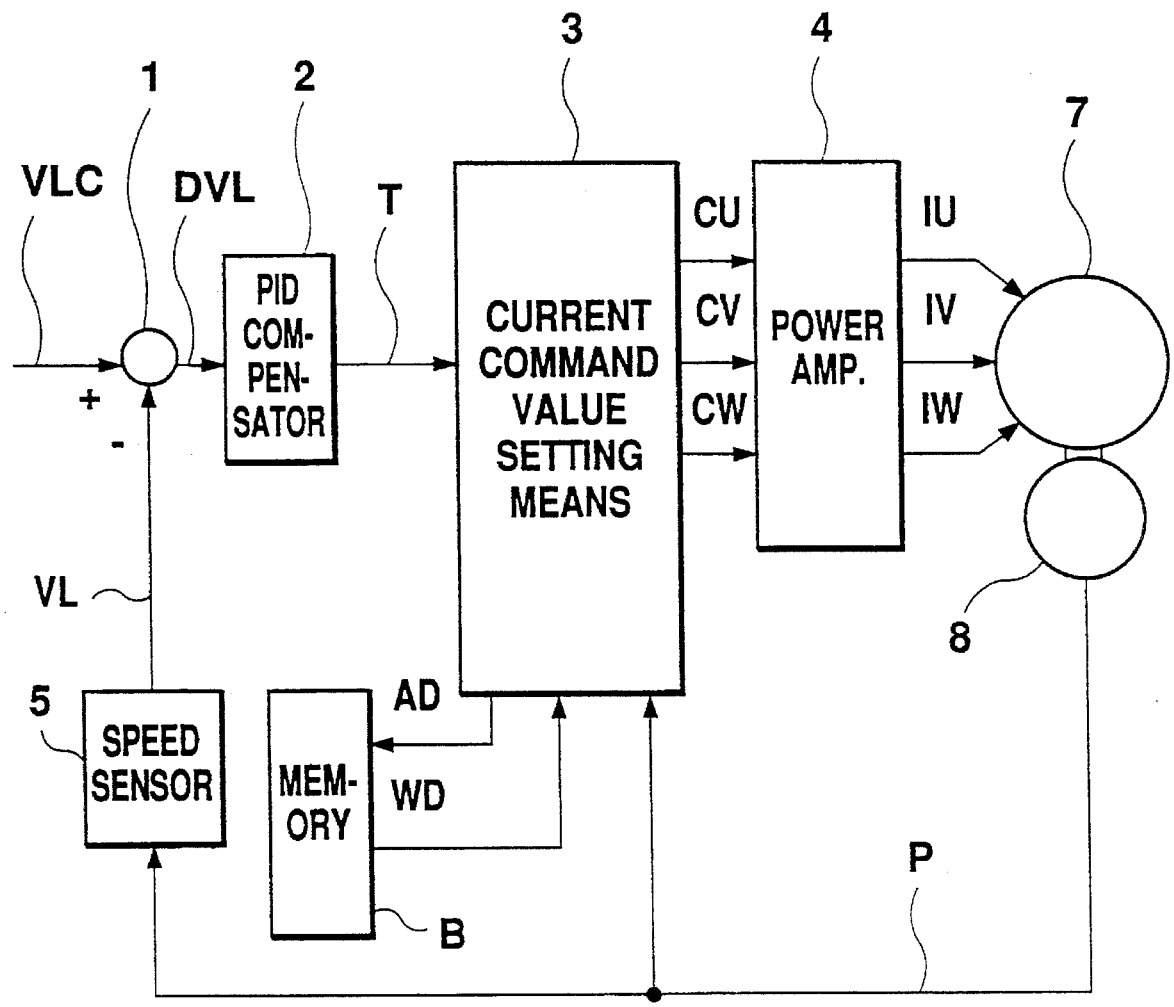
FIG. 1 is a block diagram of a control system for a three-phase synchronous motor according to the prior art.
Figures 2, 3:
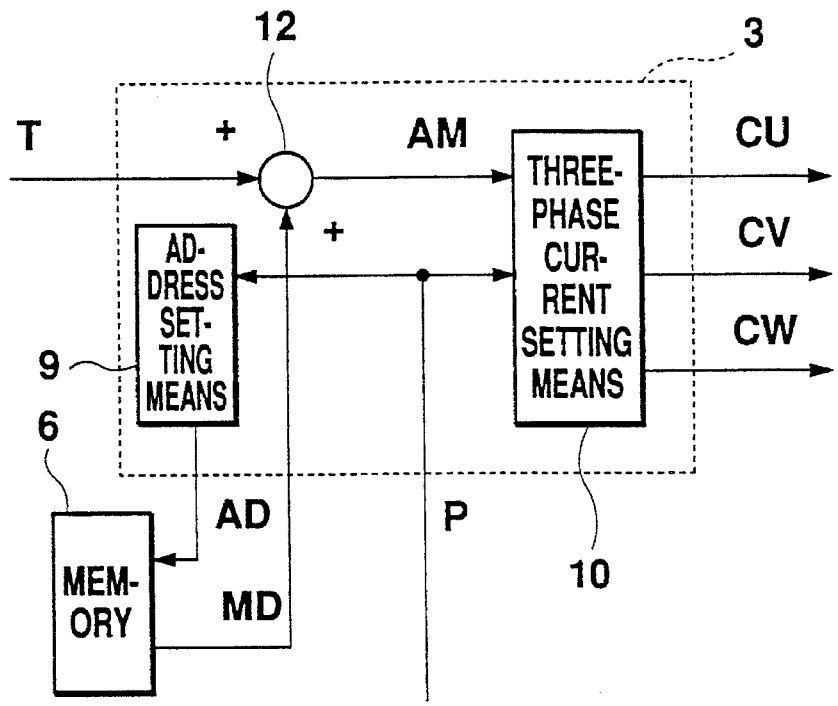
FIG. 2 is a block diagram of a current command value setting means according to the prior art.
FIG. 3 is a table illustrating the compensation of torque errors stored in a memory according to the prior art.
Figure 4:
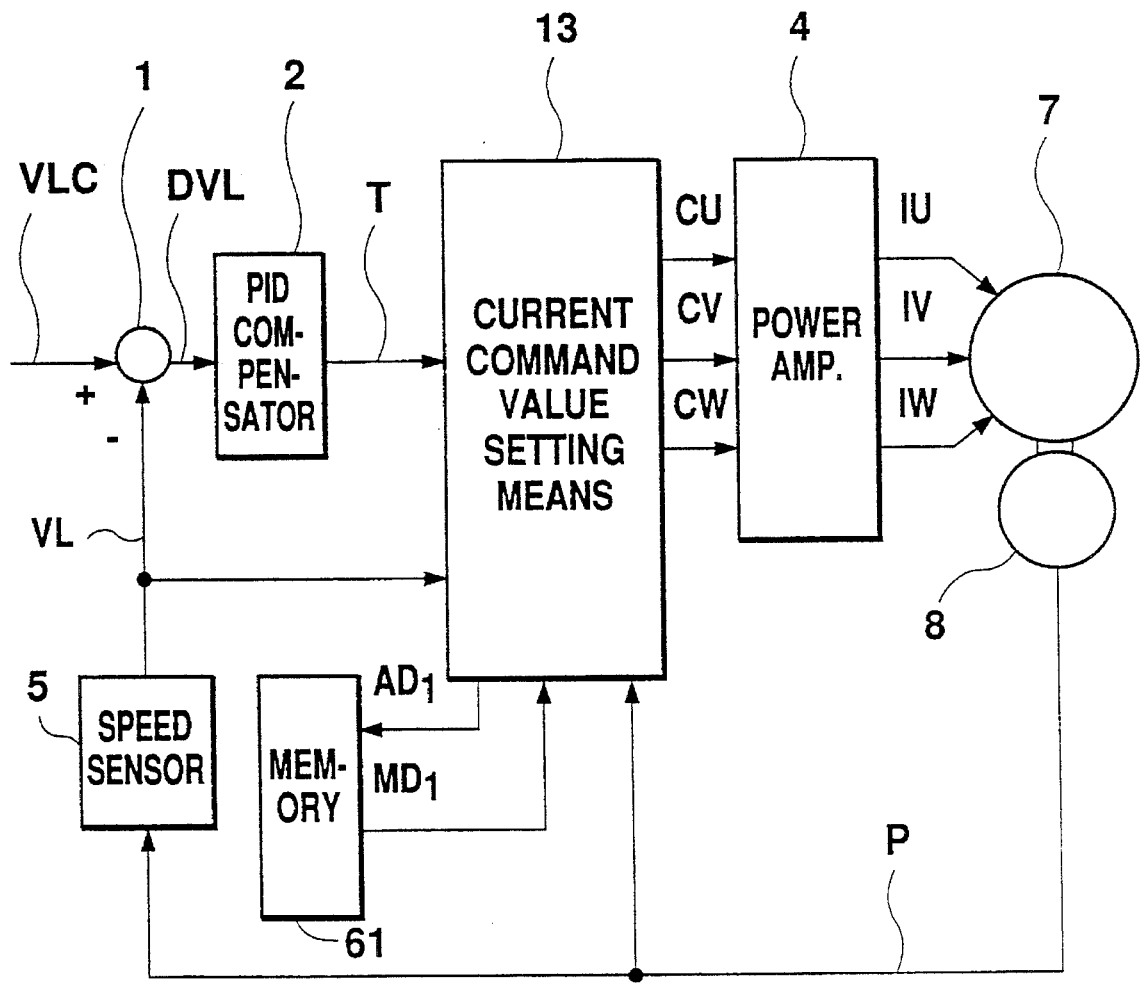
FIG. 4 is a block diagram of a control system for a three-phase synchronous motor according to the present invention.

FIG. 4 is a block diagram of a control system for a three-phase synchronous motor, constructed in accordance with the present invention.

The control system comprises a position sensor 8 for sensing the rotational position P of a three-phase synchronous motor 7. The position sensor 8 is connected to a speed sensor 5 for sensing a rotational speed VL based on the rotational position P and a current command value setting means 13. The speed sensor 5 is connected to a subtracter 1 for subtracting the rotational speed VL from a speed command VLC to determine a speed error DVL and the current command value setting means 13. The subtracter 1 is connected to a PID compensator 2 for compensating the speed error DVL to output a torque command value T. The PID compensator 2 is connected to the current command value setting means 13 for setting motor current commands CU, CV and CW based on the rotational motor position P, rotational speed VL and torque command value T of the electric motor as well as torque error information $MD_1$ read out from a memory 61. The current command value setting means 13 is connected to the memory 61 being compensation storage means for storing torque error compensation data corresponding to the torque, rotational speed and rotational position of the electric motor and further to a power amplifier 4 for supplying three-phase currents IU, IV and IW corresponding to the motor current commands CU, CV and CW to the electric motor 7.

Figures 5, 6:
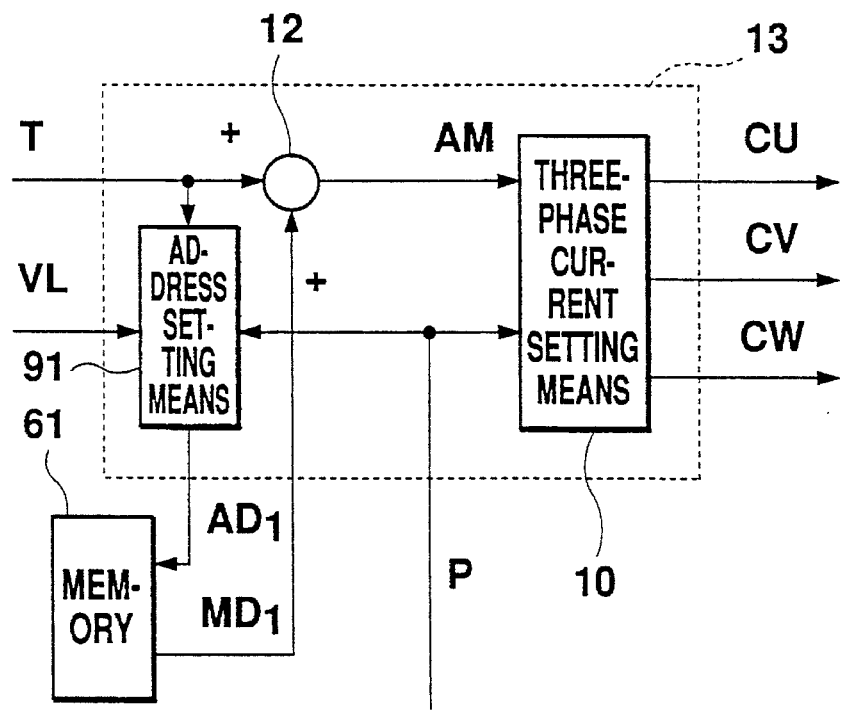
FIG. 5 is a block diagram of a current command value setting means according to one embodiment of the present invention.
FIG. 6 is a table illustrating the compensation of torque errors stored in a memory according to the present invention.

FIG. 5 is a block diagram showing the layout of the current command value setting means 13.

As shown in FIG. 5, the current command value setting means 13 comprises an address setting means 91 for preparing a read address $AD_1$ in the memory 61 based on the torque command T, speed information VL and rotational motor position P, an adder 12 operative as a motor current preparing means for preparing a motor current amplitude AM based on the torque command T and also a torque error compensation data $MD_1$ read out from the memory 61, and a three-phase current setting means 10 operative as a first motor current setting means for preparing motor current commands CU, CV and CW based on the prepared motor current amplitude AM and the rotational motor position P.

The error compensation data $MD_1$ stored in the memory 61 depends on three parameters, torque, speed VL and rotational position P and may be stored in the memory 61 as shown in FIG. 6.

On operation, the position sensor 8 senses the rotational position P of the three-phase synchronous motor 7 while the speed sensor 5 senses the rotational speed VL by differentiating the rotational position P thus sensed. On the other hand, the subtracter 1 receives the speed command VLC and subtracts the rotational speed VL from the speed command VLC to determine the speed error DVL. The speed error DVL is compensated by the PID compensator 2 which in turn outputs the torque command value T toward the current command value setting means 13. The current command value setting means 13 then sets the motor current commands CU, CV and CW based on the rotational motor position P, rotational speed VL and torque command value T. The motor current commands thus set are provided to the power amplifier 4 which in turn supplies the three phase motor currents IU, IV, IW to the electric motor 7. In such a manner, the rotation of the electric motor can more accurately be controlled by compensating the torque error.

The operation of the current command value setting means 13 will be described below. FIG. 6 is a table illustrating the compensation of torque errors stored in the memory.

The memory 61 has previously stored, as torque error data, compensated current amplitude values corresponding to the torques, speeds and rotational positions of the electric motor. The address setting means 91 prepares a read address $AD_1$ in the memory 61 based on the torque command T, speed information VL and rotational motor position P. The prepared read address $AD_1$ is used to read a torque error compensation data $MD_1$ from the memory 61. For example, if the rotational position is P3 and the rotational speed is VL2 as shown in FIG. 6, a torque error compensation data DT32 is selected and read out from the memory 61. The torque error compensation data DT32 contains a plurality of data corresponding to the magnitude of the respective torques. When the torque error compensation data is actually used, it will contain values more or less different from the actual values relating to the torque, speed and position of the electric motor. Therefore, the torque error compensation data containing values approximate to the actual values is selected. Alternatively, the torque error compensation data is interpolated and calculated based on a plurality of data approximate to the actual data.

The adder 12 adds the torque error compensation data $MD_1$ thus prepared to the torque command T to calculate a current amplitude AM in the electric motor. The three-phase current setting means 10 then sets three-phase AC current commands CU, CV and CW from the current amplitude AM and the rotational motor position P according to the following equations:

$$CU = AM \times \sin P \qquad (1)$$

$$CV = AM \times \sin (P+120) \qquad (2)$$

$$CW = AM \times \sin (P+240) \qquad (3)$$

$$AM = T + MD \qquad (4).$$

Electric power is supplied to the electric motor through a three-phase AC inverter or the like according to the three-phase AC current commands CU, CV and CW. Thus, the torque error in the electric motor can be compensated to realize a control for controlling the rotation of the electric motor with an improved accuracy.

Embodiment 2

Figure 7:
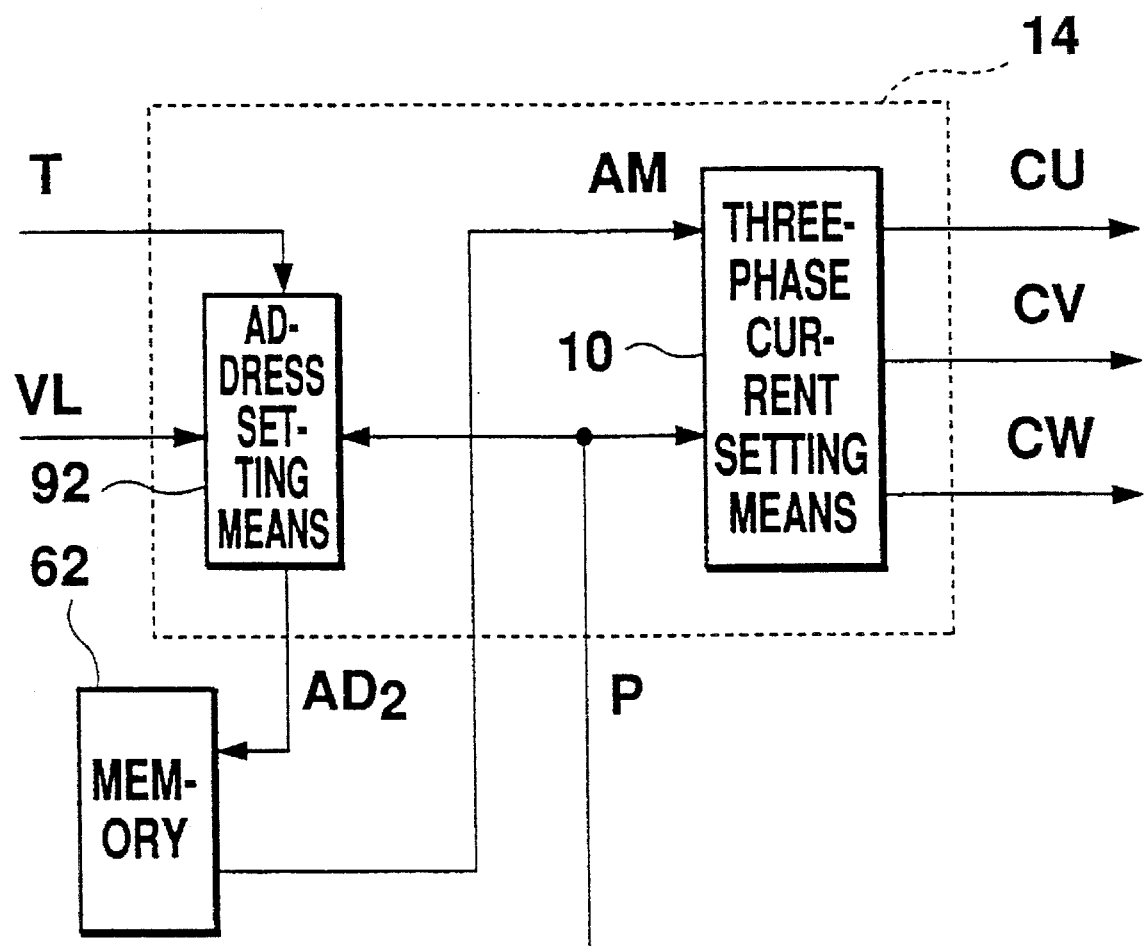
FIG. 7 is a block diagram of a current command value setting means according to another embodiment of the present invention.

FIG. 7 is a block diagram showing another current command value setting means 14 usable in the present invention.

As shown in FIG. 7, the current command value setting means 14 comprises an address setting means 92 for preparing a read address $AD_2$ in a memory 62 from the torque command T, speed information VL and rotational motor position P and a three-phase current setting means 10 operative as a motor current setting means for preparing motor current commands CU, CV and CW based on information read out from the memory 62 (motor current amplitude value $AM_1$). Therefore, the adder 12 used in the embodiment 1 is not required.

On operation, the memory 62 has previously stored motor current amplitude values AM corresponding to the torques, speeds and rotational positions of the electric motor. The address setting means 92 prepares a read address $AD_2$ in the memory 62 based on the torque command T, speed information VL and rotational motor position P. The prepared read address $AD_2$ is used to read a motor current amplitude value AM from the memory 62. The motor current amplitude value AM contains a plurality of data corresponding to the magnitude of the respective torques. When the motor current amplitude value is actually used, it will contain values more or less different from the actual values relating to the torque, speed and position of the electric motor. Therefore, the torque error compensation data containing values approximate to the actual values is selected. Alternatively, the torque error compensation data is interpolated and calculated from a plurality of data approximate to the actual data. The three-phase current setting means 10 sets three-phase AC current commands CU, CV and CW from the motor current amplitude AM and the rotational motor position P in the same manner as described above. The three-phase AC current commands CU, CV and CW may be stored in the memory 62 and read out therefrom according to the read address AD.

Embodiment 3

Figure 8:
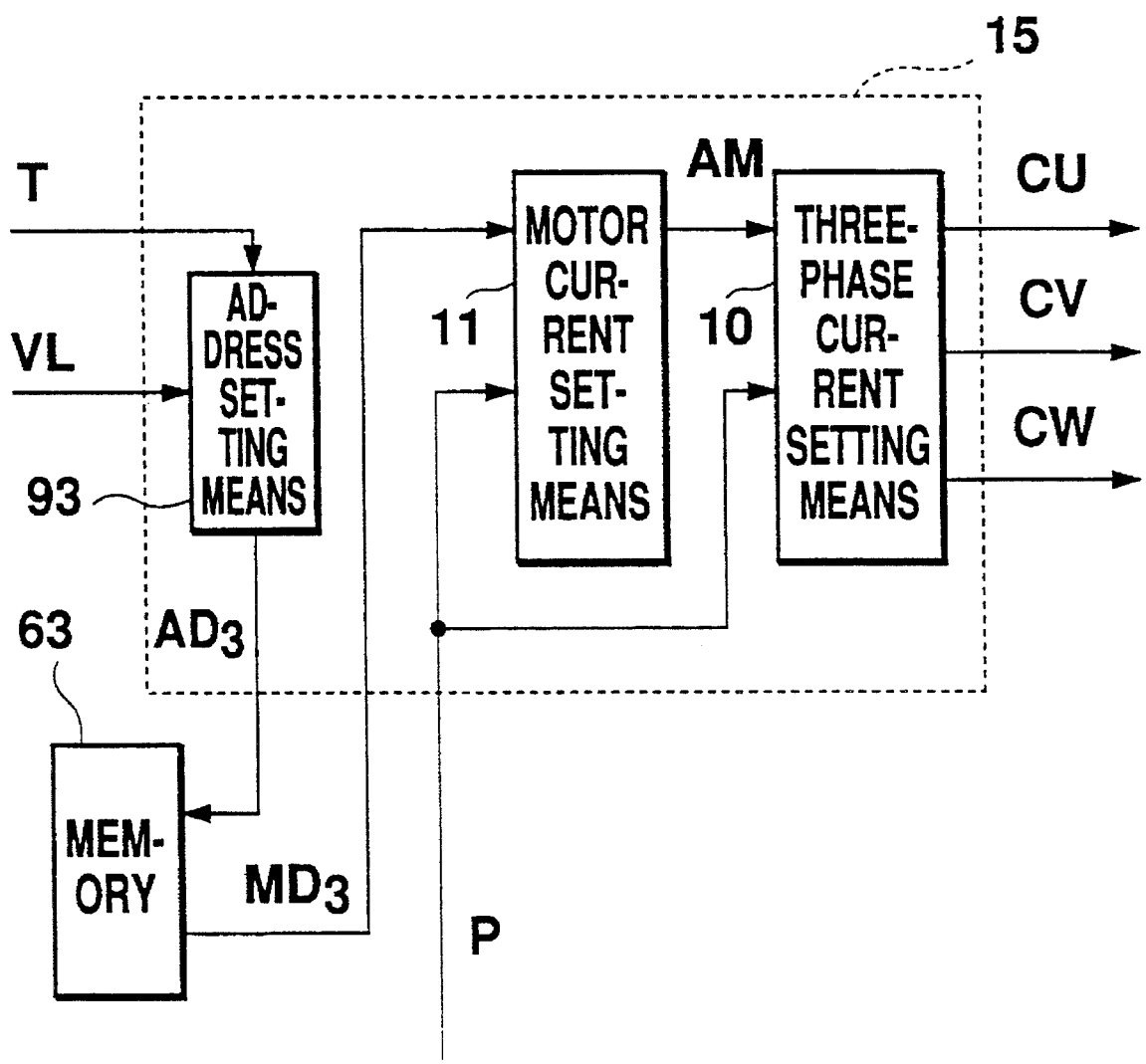
FIG. 8 is a block diagram of a current command value setting means according to still another embodiment of the present invention.

FIG. 8 is a block diagram showing still another current command value setting means 15 usable in the present invention.

A memory 63 functions as a series information storage means for storing motor current information corresponding to the torque commands T, speed information VL and rotational motor positions P as series information decomposed into a Fourier series. The current command value setting means 15 comprises an address setting means 93 for preparing a read address AD in the memory 63 based on the torque command T or a combination of the torque command T with the speed information VL, a motor current setting means 11 operative as a series reproducing means for reproducing the series based on the series information read out from the memory 63 as well as the rotational motor position P and a three-phase motor current setting means for preparing current commands CU, CV and CW in the respective phases of the motor from the output AM of the motor current setting means 11.

The third embodiment is characterized by that the enormous data containing motor torque error data or compensated motor current values is compressed to greatly reduce the memory capacity for realizing a reduced manufacturing cost in the system. In the compensation of torque error according to the prior art, the amount of data to be compensated will be enormous. Where the motor erroneous torque does not depend on the rotational speed, for example, the amount of data to be compensated is represented by:

[1000 point data per one revolution]×[500 point data depending on the magnitude of torque]×[2 byte data per one point]=1,000,000 bytes of data per one revolution.

Therefore, the present invention decomposes proper motor current information used to compensate the motor torque error into a series such as a Fourier series, depending on the torque or a combination of torque with speed. Among them, only the representative series components highly affecting the system are stored in the memory 63 in a number sufficient for the required accuracy. The series information may contain amplitude or phase values in the respective orders of the series.

Figures 11, 12:
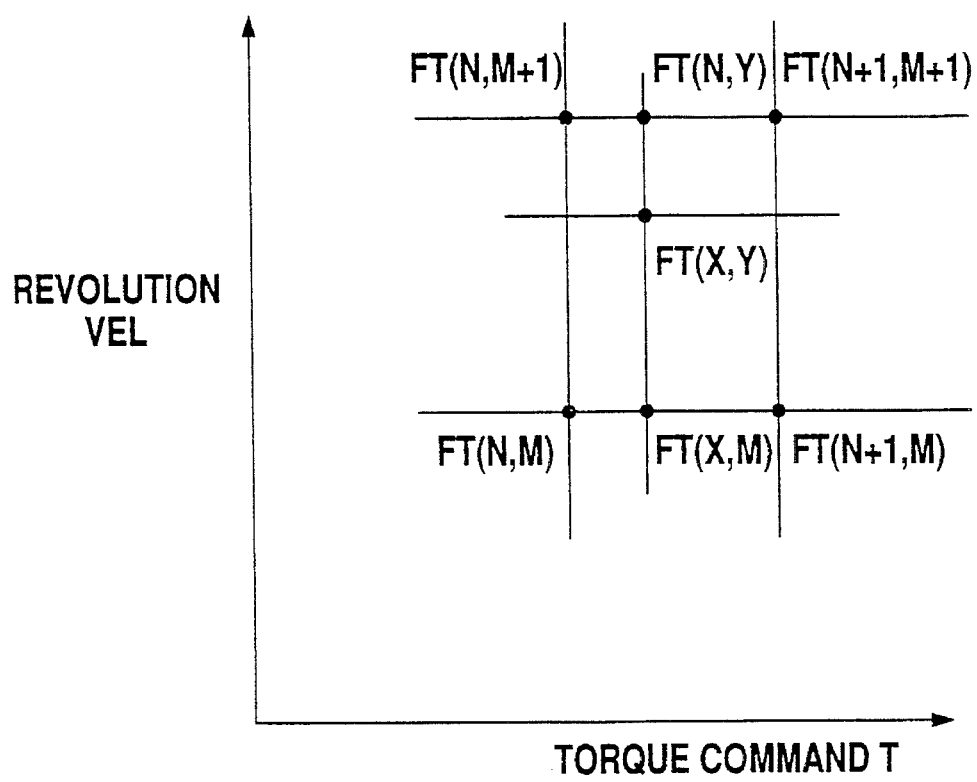
FIG. 11 is a table of series information when the erroneous torques depend on both the output torques and rotational speeds in the embodiment of the present invention.
FIG. 12 is a table illustrating the interpolation of torque error compensation values determined from the torque error compensation data.

An example of series information where the erroneous torque of the electric motor depends on the magnitude of output torque, but not the rotational speed, is shown in FIGS. 9 and 10. FIG. 9 shows the relationship between the series information FT0, FT1, FT2 . . . FTN which correspond to torque commands T, respectively. The series information FTN is a group of data which are obtained by series developing current amplitudes per one revolution of an electric motor having its output torque being TN and selecting series terms having relatively large amplitudes by the number required by the desired accuracy. As shown in FIG. 11, each of the series terms comprises a combination of amplitude FA1, FA2, FA3 . . . or FAN With phase FP1, FP2, FP3 . . . or FPN. These series information have been stored in the memory 63. When this is to be represent by an equation, the ideal amplitude in the motor current corresponding to a torque command TX can be represented by AX (P) being a function of rotational motor position P. The function AX (P) is generally represented by a Fourier series as shown by an equation 5 and can be modified as shown by an equation 6:

$$AX(P) = A_0/2 + (A_1x \cos P) + (A_2x \cos 2P) + (A_3x \cos 3P) + \ldots + (A_Nx \cos NP) + (B_1x \sin P) + (B_2x \sin 2P) + (B_3x \sin 3P) + \ldots + (B_Nx \sin NP) \quad (5)$$

$$AX(P) = FA0 + FA1x \sin(P + FP1) + FA2x \sin(2P + FP2) + FA3x \sin(3P + FP3) + \ldots + FANx \sin(NP + FPN) \quad (6)$$

FIGS. 9 and 10 show the example of series data table obtained according to the equation 6, but the present invention is not limited to such a case. The present invention may be applied to any other form of series or modifications.

As described, the prior art had to handle data amounting to 1,000,000 bytes. However, the present invention only requires the storing of information of orders having higher amplitudes. If it is now assumed that series information belonging to ten sets of orders is to be stored, the amount of data to be compensated will be equal to

[amplitudes and phases in ten sets of orders]×[500 point data depending on the magnitude of torque]=data of 20,000 bytes/ one revolution of the electric motor.

This is equal to 1/50 of the amount of data to be handled in the prior art. The reduction of data according to the present invention can qualitatively be explained by the fact that since an electrical motor is inherently constructed into a geometrically accurate form, the great portion of causes resulting in torque ripple errors resides in the shapes of slots, magnetic poles and others to provide periodical errors, rather than fully random errors.

FIG. 11 shows series information in a case where the erroneous torque of an electrical motor depends on both the output torque and rotational speed of the same. The series information two-dimensionally exist relating to torque commands T1, T2, T3 . . . and revolutions VEL1, VEL2, VEL3 . . . However, the concrete contents of the respective series information are of the same type as in FIG. 10 and show amplitudes and phases in the respective orders.

A process of preparing current command values AM in an electric motor will be described below.

Address setting means 93 prepares a read address $AD_3$ based on a torque command T and motor speed information VL. The prepared read address $AD_3$ is used to read series information $MD_3$ from the memory 63. The motor current setting means 11 then substitutes the series information, motor speed information VL and rotational motor position P for the equation (6) to realize a Fourier series which is in turn used to determine motor current amplitudes AM. As can be seen from FIGS. 9 to 11, the series information stored are almost all the finite number of numerical approximations relating to torque commands T and revolutions VEL for predetermined time intervals, rather than accurate series information relating to torque commands T and revolutions VEL in the actually Sunning motor. This can be overcome the following manner.

As shown in FIG. 12, it is now assumed that the torque command T and revolution VEL being now controlled are on plane coordinates FT (X, Y) while the series information stored in the memory are ones relating to FT (N, M), FT (N+1, M), FT (N, M+1) and FT (N+1, M+1). The simplest process utilizes the series information of the nearest FT (N, M+1) as a representative series information of FT (X, Y).

Another process determines the series information corresponding to FT (X, Y) by interpolating four approximate sets of series information. More particularly, the series information of coordinates FT (X, M) is equally distributed from the series information of FT (N, M) and FT (N+1, M), followed by a linear interpolation. Similarly, the series information of coordinates FT (N, Y) is equally distributed from the series information of FT (N, M+1) and FT (N+1, M+1), followed by a linear interpolation. The series information of FT (X, Y) to be determined is then linearly interpolated from the series information of FT (X, M) and FT (N, Y).

The motor current amplitudes AM and rotational motor position P thus determined are used to set three-phase AC current commands CU, CV and CW in the same manner as described. According to the three-phase AC current commands CU, CV and CW, electric power is supplied from the power amplifier 4 such as a three-phase AC inverter, to the electric motor 7. In such a manner, the torque errors in the electric motor can be compensated to realize an accurate control of motor rotation.

Embodiment 4

The embodiment 3 can be modified into an embodiment 4 which will be described below.

In the embodiment 3, the current amplitudes AM in the three-phase AC current commands CU, CV and CW are assumed to be a function AX (P) of the rotational motor positions P. These current amplitudes AM are developed into a Fourier series representing series information which will be stored in the memory. When the electric motor is to be controlled, the series information are inversely calculated to prepare the three-phase AC current commands CU, CV and CW. However, the embodiment 4 does not directly handle the concept of current amplitude. More particularly, it is considered that the three-phase AC current commands CU, CV and CW depend on torque T, rotational speed VL and rotational position p. The three-phase AC current commands CU, CV and CW are respectively represented by a Fourier series as a function of rotational position P and then stored in the memory. On reproduction, the three-phase AC current commands CU, CV and CW are determined by reproducing the respective series in the same manner as in the embodiment 3. Thus, the three-phase currents are respectively treated directly as a Fourier series without the use of the concept that the current amplitudes are DC values converted directly from the three-phase currents. This will increase the memory capacity and calculation, but may be aided in the following manner.

Since two commands CV and CW in the three-phase AC current commands are $CV(P)=CU(P+120)$ and $CW(P)=CU(P+240)$, the series information relating to the values CV (P) and CW (P) are substituted by the series information of CU (P). Thus, the necessary memory capacity can be reduced. Even in the embodiment 3, therefore, several modified techniques can be used.

The present invention may be applied to a control system for a three-phase AC motor performing two-to-three phase conversion and further to any other control system for multi-phase and multi-pole motors, DC motors and induction motors.

Although the description and claims are expressed by the dependency of torque error compensation data and current information on three parameters, that is, torque, speed and rotational position, the present invention may naturally be applied to such a case that the control depends less on one of these three parameters, e.g., speed. In such a case, the torque error compensation data and current information will be controlled as values which only depend on the remaining parameters, that is, torque and rotational position. The present invention also covers such a control system.

Data may be partially stored to reduce the memory capacity for motor torque error information and others. To realize a more strict control, it is of course possible that a delayed time in the detection of position, a delayed time on control and an average delayed time until the current substantially acts on the electric motor may be presumed without direct use of the rotational position information. The rotational position may be controlled by additionally using changes in rotational position corresponding to these delayed times.

What is claimed is:

1. An electric motor control system for compensating for rotational error caused by torque ripple in a torque controlled electric motor operated by a torque command signal, said control system comprising:

control information storage means for storing torque ripple error compensation control information as a function of torque command level and of both the rotational speed and rotational position of said electric motor;

a position sensor for sensing the rotational position of said electric motor and outputting a rotational position signal;

a speed sensor for sensing the rotational speed of said electric motor and outputting a rotational speed signal;

control information reading means connected to receive said torque command signal, said rotational position signal and said rotational speed signal and comprising means for reading from said control information storage means said stored torque ripple error compensation control information based on said torque command signal, said rotational position signal and said rotational speed signal;

motor current setting means connected to receive said torque ripple error compensation control information from said control information reading means for generating a motor current command for said motor in response to said torque ripple error compensation control information; and means for supplying current to said motor in response to said motor current command.

2. An electric motor control system as defined in claim 1, wherein the torque ripple error compensation control information stored in the control information storage means includes torque error compensation data used to compensate the torque error corresponding to torque command, rotational speed and rotational position of the electric motor and wherein the motor current setting means is operative to generate the motor current command by adding the torque error compensation data to the torque command signal.

3. An electric motor control system as defined in claim 1, wherein the torque ripple error compensation control information stored in the control information storage means includes torque ripple error compensated motor current information corresponding to torque command, rotational speed and rotational position of the electric motor and wherein the motor current setting means is operative to generate the motor current command from the read torque ripple error compensated motor current information.

4. An electric motor control system as defined in claim 3, wherein the torque ripple error compensated motor current information stored in the control information storage means includes information represented in the form of terms of a series representing torque ripple error compensated current information in which the amplitude is equal to or larger than a predetermined level and wherein the motor current setting means is operative to determine a series from each term in the series representing torque ripple error compensated current information read out to generate a motor current command.

5. A method of compensating the rotation error of an electric motor operated by a given torque command, comprising the steps of:

previously storing torque ripple error compensation control information as a function of torque command level, rotational speeds and rotational positions of the electric motor, sensing the rotational position of the electric motor, sensing the rotational speed of the electric motor, reading the torque ripple error compensation control information corresponding to the torque command, rotational speed and rotational position of the running motor, generating a motor current command based on the read torque ripple error compensation control information, and supplying current and voltage corresponding to the motor current command to the electric motor.

6. A method as defined in claim 5 wherein said torque ripple error compensation control information storing step includes a step of storing torque error compensation data used to compensate the torque error corresponding to the torque, rotational speed and rotational position of the electric motor and wherein said motor current command generating step includes a step of generating the motor current command by adding the torque error compensation data to the torque command signal.

7. A method as defined in claim 5 wherein said torque ripple error compensation control information storing step comprises a step of storing torque ripple error compensated motor current information corresponding to torque command, rotational speed and rotational position of the electric motor and wherein said motor current command generating step includes a step of generating the motor current command from the read torque ripple error compensated motor current information.

8. A method as defined in claim 7 wherein said torque ripple error compensation control information storing step comprises a step of developing a series representing torque error compensated motor current information and storing said torque ripple error compensated motor current information represented only by terms of said developed series in which the amplitude is equal to or larger than a predetermined level and wherein said motor current command generating step comprises a step of determining a series from each stored term in the developed series read out to generate a motor current command.

* * * * *